INVENTORS
A.J.N. DUCLOS
R. GILLIS

Patented July 5, 1949

2,475,425

UNITED STATES PATENT OFFICE 2,475,425

CONTROL APPARATUS

Aeneas J. N. Duclos, South Orange, and Randall Gillis, Westfield, N. J., assignors to Western Electric Company, Incorporated, New York, N. Y., a corporation of New York Application February 2, 1943, Serial No. 474,466

7 Claims. (Cl. 236—69)

This invention relates to control apparatus and more particularly to apparatus for controlling energy supplied simultaneously to more than one consuming unit, the apparatus acting to control both the total energy supplied per unit of time to all the units together, and the relative distribution of this total to the several units.

In the manufacture of lead pipes, lead sheathed electrical conductor cables, and analogous products, in some instances an extrusion press may be used to form the lead pipe or sheath. An essential element of such a press is a massive die block of steel or the like, having a chamber from which the lead is squeezed out by pressure through a die mounted in one wall of the chamber. To maintain uniformity of product, it is importantly needful that the temperature of the die block, not only as a whole but also in its various parts be closely controlled, as a whole in order that the metal extruded be neither too thick nor too thin generally, and as to its various parts relatively to each other about the axis of the die in order that uniformity of thickness around the cross-section of the product may be achieved and maintained.

An object of the present invention is to provide automatically operating means to regulate both the total heat supplied to two or more consuming units, such as heating elements for an extrusion die block, and the distribution of the total heat supplied among the several units.

With the above and other objects in view, the invention may be embodied in means to heat a member comprising two heating means to act on the member at separate portions thereof, energy transmitting means having one common input and separate outputs to the two heating means, means to control the total energy passing through the input, independent means to control the energy passing through each output, thermoresponsive means located in each separately heated portion of the member, means actuated by the two said thermoresponsive means in accordance with the difference of the response thereof to actuate correspondingly the two output control means, a third thermoresponsive means located in the member, and means actuated by the third thermoresponsive means to actuate the input control means.

Figure 1:
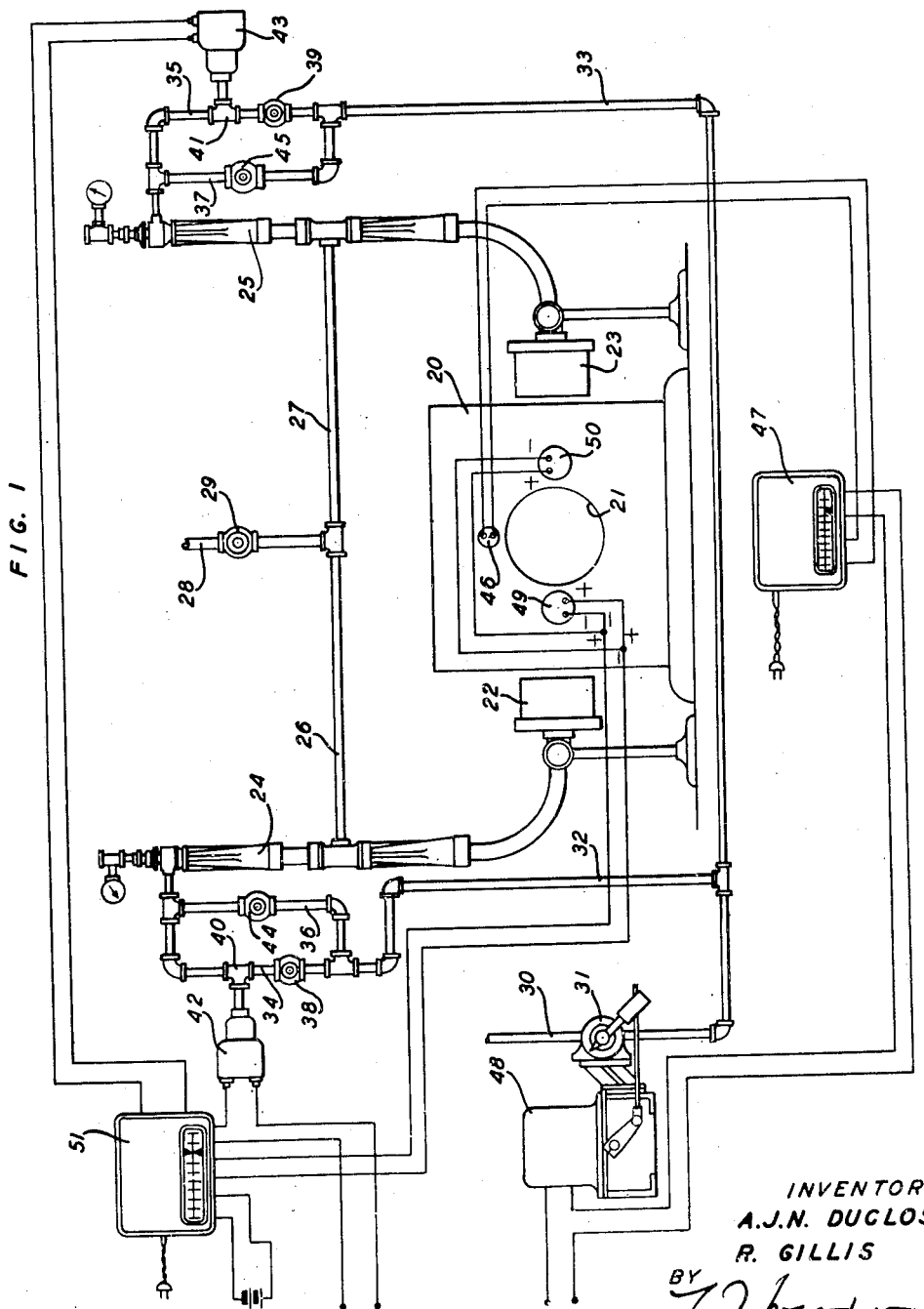
Figure 2:
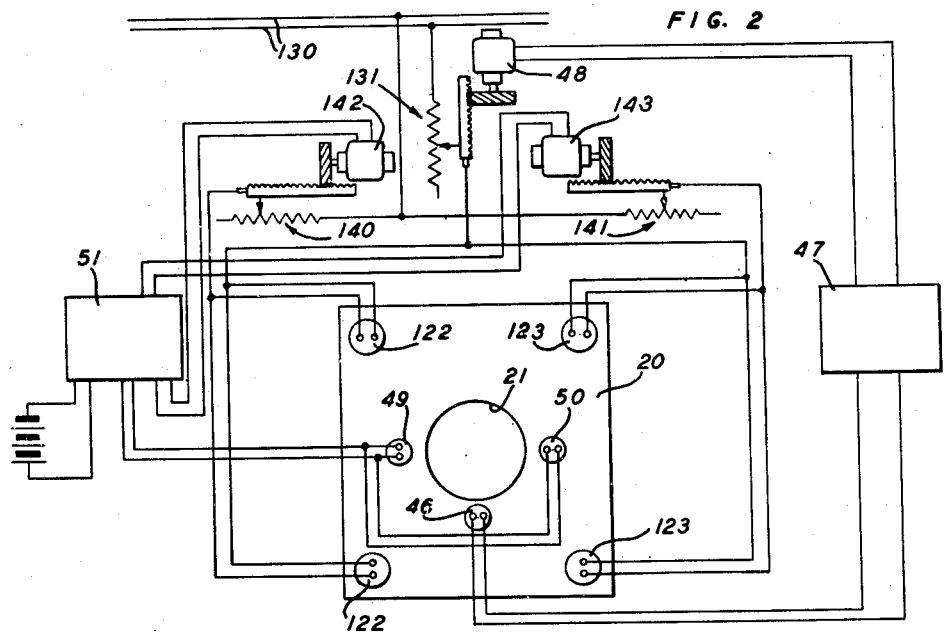
Figure 3:
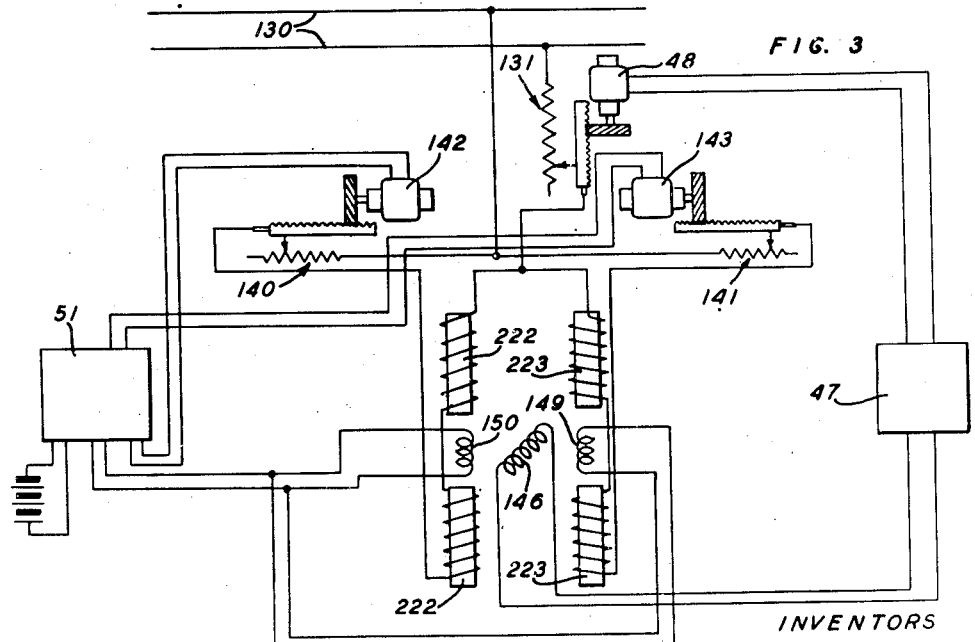

Other objects and features of the invention will appear from the following detailed description of embodiments thereof taken in connection with the accompanying drawings in which the same reference numerals are applied to identical parts in the several figures and in which Fig. 1 is a diagrammatical representation of the fuel supply to the two-sided heating means for the die block of an extrusion block and of control means for the fuel supply embodying the invention;

Fig. 2 is a similar view of a corresponding arrangement in which the die block is electrically heated; and Fig. 3 is a similar view of another modified form of embodiment.

In the illustrative embodiment of the invention shown in Fig. 1, the invention is disclosed and described as embodied in means to control both total and differential heat supply to the die block of a cable sheath extrusion press heated by two heating units acting on horizontally opposite sides of the block. The fact that the member in question to be heated is a die block is not material to the invention serving merely to give body to the problem to the solution of which the invention is directed. Hence nothing of the press is shown in the drawings except the diagrammatically represented die block 20 with its die aperture 21. On either side of the block 20 is located a heating means, specifically a pair of gas burners 22 and 23. Mixed gas and air fuel (i. e. potential energy) is supplied to these burners respectively by gas and air mixing devices 24 and 25. Gas is fed to the devices 24 and 25 through pipes 26 and 27 through a common supply main 28 and a valve 29 as shown, from any suitable source not shown. Air under pressure is supplied to the devices 24 and 25 from any suitable source not shown, through a common main 30, a common control valve 31 and pipes 32 and 33 respectively. The pipe 32 divides into two branches 34 and 36 which reunite just before entering the device 24. The pipe 33 divides similarly in a loop 33, 35. In the branch 34 are a hand operable shut-off valve 38 and a throttle valve 40 actuable by a solenoid 42. In the branch 35 of the pipe 33 are like valves 39 and 41 respectively, the latter actuable by a solenoid 43. In the branches 36 and 37 are hand operable shut-off valves 44 and 45 respectively.

The devices 24 and 25 may be thought of as venturi mixers in which the air entering under pressure from the air supply tubes 30 and 31 entrains gas from the gas supply pipes 24 and 25 in proportion to the amount of air entering each device; and this mixture of air and gas is then delivered to and burned in the burners 22 and 23. Thus the total amount of air and therefore also of gas delivered to the two burners together is controlled by the main air control valve 31. The ratio in which this totally controlled flow of fuel is divided between the burners is then controlled by the two air throttle valves 40 and 41. The valves 38 and 39 are closed only when the machine is shut down, as is also the main gas valve 29. Otherwise these three valves are normally wide open. The valves 44 and 45 are also closed when the machine is shut down; but in normal operation they are adjusted so far open each as to divide the air supply from 31 to 24 and 25 in whatever ratio experience or experiment shows to be an average for the prevailing conditions of weather, drafts, atmospheric temperature, etc. The valves 40 and 41, the solenoids 42 and 43 being normally deenergized, are normally closed. If, however, one of them, say 40, is opened by actuation of the corresponding solenoid 42, the fixed amount of air coming from the valve 31 has a freer path to the burner 22 through the two parallel valves 40 and 44 than through the single valve 45 to the burner 23. Hence, the fixed amount of fuel supplied to the two burners 22 and 23 together is then so divided that more flows to 22 than to 23. Thus, under ordinary operating conditions, the valve 31 controls the total supply of heat to the block 20, while the valves 40 and 41 control the division of the heat between the two sides of the block.

A thermoresponsive device 46 mounted at any convenient site in the wall of the block 20, but preferably at some point substantially equally affected by changes in heat delivered by the two burners, is connected to automatic temperature indicating and motor control means 47. The temperature indicating function of this means is not essential to the invention, being primarily an operating convenience. This control means 47 is in turn connected to a motor 48 to start, stop or reverse the same as directed by the device 46 through the means 47. Thus the total supply of heat to the block 20 is governed by the device 46.

Two other thermoresponsive devices, 49 and 50 respectively, are located in the body of the block 20, symmetrically on opposite sides. They are of like character and are so connected to common conductors that their polarities are opposed to each other and hence their responses work against each other. Being thus connected to each other, they are together connected by the common conductors to a device 51 which is connected to the two solenoids 42 and 43, the primary function of the device 51 being to energize the solenoid 42 or 43 according as the response of the device 50 is less or greater than that of the device 49 and to deenergize both solenoids 42 and 43 when the responses of the devices 49 and 50 annul each other. Thus the devices 49 and 50 acting through the device 51 and the throttle valves 40 and 41 control the division of the total fuel, governed by the valve 31, between the burners 22 and 23.

The particular structure and mode of operation of the devices 47 and 51 form no part of the present invention, these being devices commercially available in the general market. However, if desired, reference may be had to U. S. Patent 1,578,279, of March 30, 1926, to G. H. Gibson, U. S. Patent 1,934,882, of November 14, 1933, and U. S. Patent 1,935,732, of November 21, 1933, to L. Y. Squibb, for detailed disclosures of apparatus suitable for these purposes. For the present disclosure it is sufficient to note that the device 47 acts to start, stop or reverse the motor 48 according as the thermoresponsive device 46 shows a temperature lower than, equal to, or above a desired predetermined optimum value, while the device 51 acts to energize the solenoid 42 or the solenoid 43, or deenergize both according as the thermoresponsive device 49 shows a temperature below, above, or equal to the temperature shown by the device 50, regardless of what the absolute values of these two temperatures may be.

Furthermore, the device 51 may also be so adjusted as to maintain a constant temperature difference instead of a constant temperature equality between the sites of the devices 49 and 50, if desired, i. e. the device 51 may be adjusted to deenergize both solenoids 42 and 43 when the temperature difference at 49 and 50 has a predetermined value in a predetermined sense, and to energize either solnoid 42 or 43 as may be required to maintain this condition.

There is shown in Fig. 2 a modified form of the above arrangement, in which the die block 20 is heated by means of four electrical heating units in two pairs, a left hand pair 122, 122 and a right hand pair 123, 123 connected as shown in the figure to power supply mains 130 through a motor driven supply control means such as a rheostat 131 actuated by a motor 48. The supply circuit from the mains 130 to the two pairs of heating elements is a Y with the control means 131 in the stem of the Y to control the total energy delivered to all the heating elements. The motor 48 which drives the rheostat 131 is started, stopped, and reversed, by the device 47 as before in accordance with the responses of the device 46. The differential control thermocouples 49 and 50 are connected as before through the device 51, but here to motors 142 and 143 controlling opposed means such as rheostats 140 and 141 in the two branches of the Y circuit to divide the power flow from the stem of the Y between the two branches of the Y according to the thermal difference at 49 and 50 without modifying the total flow, by increasing the resistance at one while simultaneously diminishing resistance at the other.

It will be noted that in the arrangement of Fig. 1, there is also a Y path whose stem is at 30 and whose branches are the two loops 34, 36 and 35, 37 respectively, with their respectively associated mixers 24 and 25 and burners 22 and 23. In travelling along this Y path, the compressed air takes up fuel in the mixers and delivers energy or power in the burners. In Fig. 2, electrical power delivered into the stem of the Y is converted into heat energy at the extremities of the branches. In the appended claims, phrases such as "means to supply or transmit energy" or "a Y-shaped path for energy" will be taken to include not only such arrangements as that of Fig. 2 in which electrical power is supplied by flowing through all of a Y-shaped path, but also arrangements as disclosed in Fig. 1 in which potential energy or a component of means having potential energy flows through such a path, picking up added components on the way or being otherwise modified during the passage.

It is also to be noted that both the valve 31 of Fig. 1 and the rheostat 131 of Figs. 2 and 3 are in effect throttling devices which act to control the passage of energy flow to them by increasing or diminishing resistance to such flow. The same is also true of the valves 40 and 41 of Fig. 1 and the rheostats 140 and 141 of Figs. 2 and 3.

Hence, in the appended claims in a phrase such as "means in the stem of the path (or in each branch of the Y path) to vary the resistance of the stem (or of that branch of the Y path) to the passage of energy therethrough" the "means" so described may be a throttle valve or a rheostat or any operatively equivalent device or means. In the same way a "throttle" in a path is a valve, or rheostat or any other variable resistance to the flow of energy through the path.

The above two arrangements disclose the invention embodied in means to control the total heat supplied to two sides of an extrusion press die block and to control the distribution of the total heat between the two sides. The invention is not limited to this or any one particular application. Fig. 3 is a schematic diagram of an arrangement in which the total energy delivered to an alternating magnetic field is controlled by the coil 146 through the devices 47 and 48, while the distribution of the energy to the field is controlled by coils 149 and 150 through the difference control device 51 and the devices 140 and 141, the field being generated from A. C. mains 130 by two electromagnet pairs 222, 222 and 223, 223.

The embodiments of the invention above disclosed are illustrative and may be variously modified and departed from without departing from the spirit and scope of the invention as described and particularly pointed out in the appended claims.

What is claimed is:

1. In a machine, a power consuming block, means defining a Y shaped path for the flow of energy from an input to two distinct, but not independent portions of the block to thereby supply energy to the entire block countercurrently from both branches of the Y through both portions of the block, a throttle in the stem of the Y to control the total energy supplied from the input to the whole block, a throttle in each branch of the Y to vary the resistance of that branch to the passage of energy therethrough, means on the block and responsive to the general energy state of the whole block, a motor controlled by the last named means and connected to the throttle in the stem of the Y to actuate the same in response to variations of the general energy state of the block, two individual means respectively in the two portions of the block and individually respectively responsive to the energy states of the respective portions, two motors respectively connected to the two throttles in the branches of the Y to actuate the same, and differential control means connected to the two last named responsive means to be actuated thereby and connected to the two last named motors to control the motors to actuate the throttles in the branches of the Y in accordance with variations in the difference of response of the two corresponding responsive means.

2. In a machine, a power consuming block, means defining a Y shaped path for the flow of energy from an input to two distinct, but not independent portions of the block to thereby supply energy to the entire block countercurrently from both branches of the Y through both portions of the block, a throttle in the stem of the Y to control the total energy supplied from the input to the whole block, a throttle in each branch of the Y to vary the resistance of that branch to the passage of energy therethrough, means on the block and responsive to the general energy state of the whole block, a motor connected to the throttle in the stem to actuate the same, motor control means connected to the energy responsive means to be actuated thereby and connected to the motor to energize the same in accordance with variations in the response of the responsive means with variations in the general energy state of the whole block, two individual means respectively in the two portions of the block and individually respectively responsive to the energy states of the respective portions, two motors respectively connected to the two throttles in the branches of the Y to actuate the same, and differential control means connected to the two last named responsive means to be actuated thereby and connected to the two last named motors to control the motors to actuate the throttles in the branches of the Y in accordance with variations in the difference of response of the two corresponding responsive means.

3. In a machine, a block member to be heated, two independent heating means acting on two portions of the block member to heat the member countercurrently through two sides thereof, means defining a Y shaped path for the flow of energy from an input to the two heating means, a throttle in the stem of the Y to control the total energy supplied from the input to the block member through the two heating means together, a throttle in each branch of the Y to vary the resistance of that branch to the passage of energy therethrough, a thermoresponsive means on the block member and responsive to the general thermal state of the whole block member to actuate the throttle in the stem of the Y, two thermoresponsive means respectively on the two portions of the block member and responsive respectively to the thermal states of the two portions individually, and differential means connected to the two last named thermoresponsive means to be actuated thereby and connected to the two last named throttles in the branches of the Y to actuate the throttles according to variations in the difference of response of the two thermoresponsive means.

4. In a machine, a unitary block member to be heated, two separate fuel burners acting on separate portions thereof, pipes defining a Y-shaped path for fuel from an input to the two burners, a valve in the stem of the Y to control the total fuel supplied to the two burners together, a valve in each branch of the Y to vary the resistance of that branch to the passage of fuel, a thermoelectric couple responsive to the general thermal state of the block member, means responsive to the output of the said couple to actuate the valve in the stem of the Y, two thermoelectric couples respectively responsive particularly to the thermal states of the two portions of the member, and means responsive to the difference of output of the two last named couples to actuate the two valves in the branches of the Y according to the said difference.

5. In a machine, a unitary block member to be heated, two separate fuel burners acting on separate portions thereof, pipes defining a Y-shaped path for fuel from an input to the two burners, a valve in the stem of the Y to control the total fuel supplied to the two burners together, a valve in each branch of the Y to vary the resistance of that branch to the passage of fuel, an electric motor means for each of the three valves, a thermoelectric couple responsive to the general thermal state of the block member, means responsive to the output of the couple to actuate the motor means for the valve in the stem of the Y, two thermocouples respectively responsive particularly to the thermal states of the two portions of the member, and means responsive to the difference of output of the two last named couples to actuate the respective motor means for the two valves in the branches of the Y according to the said difference.

6. In a machine, a unitary block member to be heated, two separate fuel burners acting on separate portions thereof, pipes defining a Y-shaped path for fuel from an input to the two burners, a valve in the stem of the Y to control the total fuel supplied to the two burners together, a valve in each branch of the Y to vary the resistance of that branch to the passage of fuel, an electric motor means for each of the three valves, a thermoelectric couple responsive to the general thermal state of the block member, means responsive to the output of the couple to actuate the motor means for the valve in the stem of the Y, two thermocouples respectively responsive particularly to the individual thermal states thereof, and means responsive to the difference of output of the two last named couples to actuate one or the other of the respective motor means for the two valves in the branches of the Y according to the sense of the said difference.

7. In a machine, a unitary block member to be heated, two separate electrical heating units acting on separate portions thereof, conductors defining a Y-shaped current path from an input to the two units, electrical throttle means in the stem of the Y to control the total energy delivered to the two units together, electrical throttle means in each branch of the Y to vary the freedom of passage of energy through that branch, a thermoelectric couple responsive to the general thermal state of the block member, means responsive to the output of the said couple to actuate the throttle means in the stem of the Y, two thermoelectric couples respectively responsive particularly to the individual thermal states thereof, and means responsive to the difference of output of the two last named couples to actuate the throttle means in the two branches of the Y according to the said difference.

AENEAS J. N. DUCLOS.
RANDALL GILLIS.

REFERENCES CITED

The following references are of record in the file of this patent:

UNITED STATES PATENTS

| Number | Name | Date |
|---|---|---|
| 1,212,749 | Dobson | Jan. 16, 1917 |
| 1,603,729 | Wilhjelm | Oct. 19, 1926 |
| 1,816,311 | Brown | July 28, 1931 |
| 2,055,988 | Stacey | Sept. 29, 1936 |
| 2,104,563 | Kurlbaum | Jan. 4, 1938 |
| 2,120,803 | Grant | June 14, 1938 |
| 2,241,108 | Akers | May 6, 1941 |
| 2,272,769 | Crago | Feb. 10, 1942 |
| 2,285,288 | Krogh | June 2, 1942 |
| 2,337,410 | Peters | Dec. 21, 1943 |
| 2,369,681 | Miles | Feb. 20, 1945 |

FOREIGN PATENTS

| Number | Country | Date |
|---|---|---|
| 146,245 | Austria | June 25, 1936 |